(12) United States Patent
Lim et al.

(10) Patent No.: US 8,477,667 B2
(45) Date of Patent: Jul. 2, 2013

(54) APPARATUS AND METHOD FOR TRANSMITTING AND RECEIVING CONTROL INFORMATION IN A BROADBAND WIRELESS COMMUNICATION SYSTEM USING HALF FREQUENCY DIVISION DUPLEX

(75) Inventors: Jun-Sung Lim, Seoul (KR); Jae-Weon Cho, Seongnam-si (KR); Ho-Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 660 days.

(21) Appl. No.: 12/578,229

(22) Filed: Oct. 13, 2009

(65) Prior Publication Data

US 2010/0091689 A1 Apr. 15, 2010

(30) Foreign Application Priority Data

Oct. 13, 2008 (KR) .......................... 10-2008-0100375

(51) Int. Cl.
*H04B 1/44* (2006.01)
(52) U.S. Cl.
USPC ............................ 370/282; 370/338; 370/474

(58) Field of Classification Search
USPC ................. 370/203–210, 276–296, 338, 474; 375/260–265
See application file for complete search history.

(56) References Cited

U.S. PATENT DOCUMENTS 8,160,101 B2 * 4/2012 Kwak et al. ................... 370/471
2007/0268848 A1 11/2007 Khandekar et al.

OTHER PUBLICATIONS

Hiroshi Furukawa et al., SSDT-Site Selection Diversity Transmission Power Control for CDMA Forward Link, IEEE JSAC, Aug. 2000, vol. 18, No. 8, pp. 1546-1554.
Victor S. et al., Robust Adaptive Error Control, WCNC, 2000, vol. 2, pp. 644-648.
Chris Heegard et al., High Performance Wireless Ethernet, IEEE Communications Magazine, Nov. 2001, pp. 64-73.

* cited by examiner

*Primary Examiner* — Kan Yuen
(74) *Attorney, Agent, or Firm* — Jefferson IP Law, LLP

(57) ABSTRACT

An apparatus and method for transmitting/receiving control information in a broadband wireless communication system using Half Frequency Division Duplex (H-FDD) are provided. An operation of a Mobile Station (MS) includes, in the case of a frame at which control information is not transmitted, performing uplink communication at a front end of the frame and, in the case of a frame at which the control information is transmitted, performing downlink communication at a front end of the frame.

10 Claims, 8 Drawing Sheets

APPARATUS AND METHOD FOR TRANSMITTING AND RECEIVING CONTROL INFORMATION IN A BROADBAND WIRELESS COMMUNICATION SYSTEM USING HALF FREQUENCY DIVISION DUPLEX

PRIORITY

The present application claims the benefit under 35 U.S.C. §119(a) of a Korean patent application filed in the Korean Intellectual Property Office on Oct. 13, 2008 and assigned Serial No. 10-2008-0100375, the entire disclosure of which is hereby incorporated by reference.

BACKGROUND OF THE INVENTION

1. Field of the Invention

The present invention relates to a broadband wireless communication system. More particularly, the present invention relates to an apparatus and method for transmitting/receiving control information in a broadband wireless communication system using Half Frequency Division Duplex (H-FDD).

2. Description of the Related Art

In general, a wireless communication system is designed to enable data transmission/reception between two parties. To support such data transmission/reception, the wireless communication system separates a transmission/reception channel on the basis of frequency or time and uses the separated transmission/reception channel for each party. Frequency Division Duplex (FDD) represents a scheme of dividing a transmission/reception channel on a frequency axis and performing communication. Time Division Duplex (TDD) represents a scheme of dividing a transmission/reception channel on a time axis and performing communication. The FDD scheme requires filtering a receive signal to cancel interference that may occur due to the introduction of a transmit signal into a reception unit. Also, because a transmission unit and a reception unit must be separately provided, a realization cost increases.

To address these concerns, a Half FDD (H-FDD) scheme realizable by a single transmitting/receiving unit that implements the merits of the FDD scheme has been proposed. Like the FDD scheme, the H-FDD scheme distinguishes a transmission channel and a reception channel at a frequency axis, but carries out transmission and reception during a different time. Thus, considering only one transmit end and receive end, the H-FDD scheme wastes a half resource compared to the FDD scheme. However, in a conventional wireless communication system in which a Base Station (BS) and a plurality of Mobile Stations (MSs) perform communication, a resource waste is prevented by grouping the MSs into two groups and applying a different transmission pattern to each group as illustrated in FIG. 1. That is, as illustrated in FIG. 1, while first-group H-FDD MSs receive DownLink (DL) signals 111 through DL bands, second-group H-FDD MSs transmit UpLink (UL) signals 121 through UL bands. And, while the first-group H-FDD MSs transmit UL signals 115 through UL bands, the second-group H-FDD MSs receive DL signals 125 through DL bands. At this time, because there is only one transmission/reception unit, each MS requires Transmit/receive Transition Gap (TTG) intervals 113 and 127 for conversion from a reception mode to a transmission mode and Receive/transmit Transition Gap (RTG) intervals 117 and 123 for conversion from the transmission mode to the reception mode.

As described above, by applying the H-FDD scheme, an MS may include only one transmission/reception unit. However, as illustrated in FIG. 1, there is no interval in which MSs that belong to different groups simultaneously receive DL signals. In this case, there is a problem in transmitting system information required to be commonly transmitted by a BS to all the MSs. For example, in an Orthogonal Frequency Division Multiple Access (OFDMA) wireless communication system, MSs cannot perform communication until acquiring control information such as a Cyclic Prefix (CP) length, a bandwidth, resource block information, antenna related information, etc. If there is no interval in which MSs that belong to different groups simultaneously receive DL signals as in FIG. 1, a BS must repeatedly transmit the control information separately for each group, i.e., the BS must repeat transmission a number of times equal to the number of groups. However, the control information is an overhead and, with an increase of the number of times of transmission of the control information, a resource available for data transmission decreases. Thus, there is a need for an apparatus and method for transmitting control information using less overhead in a wireless communication system using H-FDD.

SUMMARY OF THE INVENTION

An aspect of the present invention is to address at least the above-mentioned problems and/or disadvantages and to provide at least the advantages described below. Accordingly, an aspect of the present invention is to provide an apparatus and method for transmitting control information using less overhead in a broadband wireless communication system using Half Frequency Division Duplex (H-FDD).

Another aspect of the present invention is to provide an apparatus and method for, upon control information transmission, forwarding control information to a Mobile Station (MS) operating in a transmission mode in a broadband wireless communication system using H-FDD.

A further aspect of the present invention is to provide an apparatus and method for, upon control information transmission, making an MS operating in a transmission mode exceptionally operate in a reception mode for the sake of control information reception in a broadband wireless communication system using H-FDD.

Still another aspect of the present invention is to provide an apparatus and method for, upon control information transmission, providing part of control information, which fails to be received due to transmission/reception mode conversion, to an MS operating in a transmit mode in a broadband wireless communication system using H-FDD.

The above aspects are achieved by providing an apparatus and method for transmitting/receiving control information in a broadband wireless communication system using H-FDD.

In accordance with an aspect of the present invention, a control information reception method of an MS operating in a transmission mode at a front end of a frame in a broadband wireless communication system using H-FDD is provided. The method includes performing, in the case of a first frame in which control information is not transmitted, uplink communication at a front end of the first frame and performing, in the case of the first frame in which the control information is transmitted, downlink communication at the front end of the first frame.

In accordance with another aspect of the present invention, a control information transmission method of a Base Station (BS) in a broadband wireless communication system using H-FDD is provided. The method includes transmitting at least one symbol, from among symbols constituting a control information sub-frame, at a last downlink sub-frame of a frame that is earlier than a first frame in which control information is transmitted, and transmitting the symbols constituting the control information sub-frame at a first sub-frame of the first frame.

In accordance with a further aspect of the present invention, an MS apparatus operating in a transmission mode at a front end of a frame in a broadband wireless communication system using H-FDD is provided. The apparatus includes a controller. The controller performs, in the case of a first frame in which control information is not transmitted, uplink communication at a front end of the first frame and performs, in the case of the first frame in which the control information is transmitted, downlink communication at the front end of the first frame.

In accordance with yet another aspect of the present invention, a BS apparatus in a broadband wireless communication system using H-FDD is provided. The apparatus includes a mapper and a transmitter. The mapper maps at least one symbol, from among symbols constituting a control information sub-frame, to a last downlink sub-frame of a frame that is earlier than a first frame in which control information is transmitted, and maps symbols constituting the control information sub-frame to a first sub-frame of the first frame. The transmitter transmits the at least one symbol and the symbols constituting the control information sub-frame.

In accordance with still another aspect of the present invention, a broadband wireless communication system using H-FDD is provided. The system includes an MS. The MS receives at least one symbol of a control information sub-frame through a last downlink sub-frame of a second frame that is earlier than a first frame in which control information is transmitted, receives at least one remaining symbol of the control information sub-frame, other than the at least one symbol, by maintaining a reception mode at a first sub-frame of the first frame, and constructs the control information sub-frame by combining the at least one symbol and the at least one remaining symbol.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A technique for transmitting control information using less overhead in a broadband wireless communication system using Half Frequency Division Duplex (H-FDD) according to an exemplary embodiment of the present invention is described below. In the exemplary embodiments described below, the present invention is shown as applied to a wireless communication system using an Orthogonal Frequency Division Multiplexing (OFDM)/Orthogonal Frequency Division Multiple Access (OFDMA) scheme. However, this is not to be construed as limiting and it is understood that the present invention is also applicable to any wireless communication system including those of a different scheme.

Figure 1:
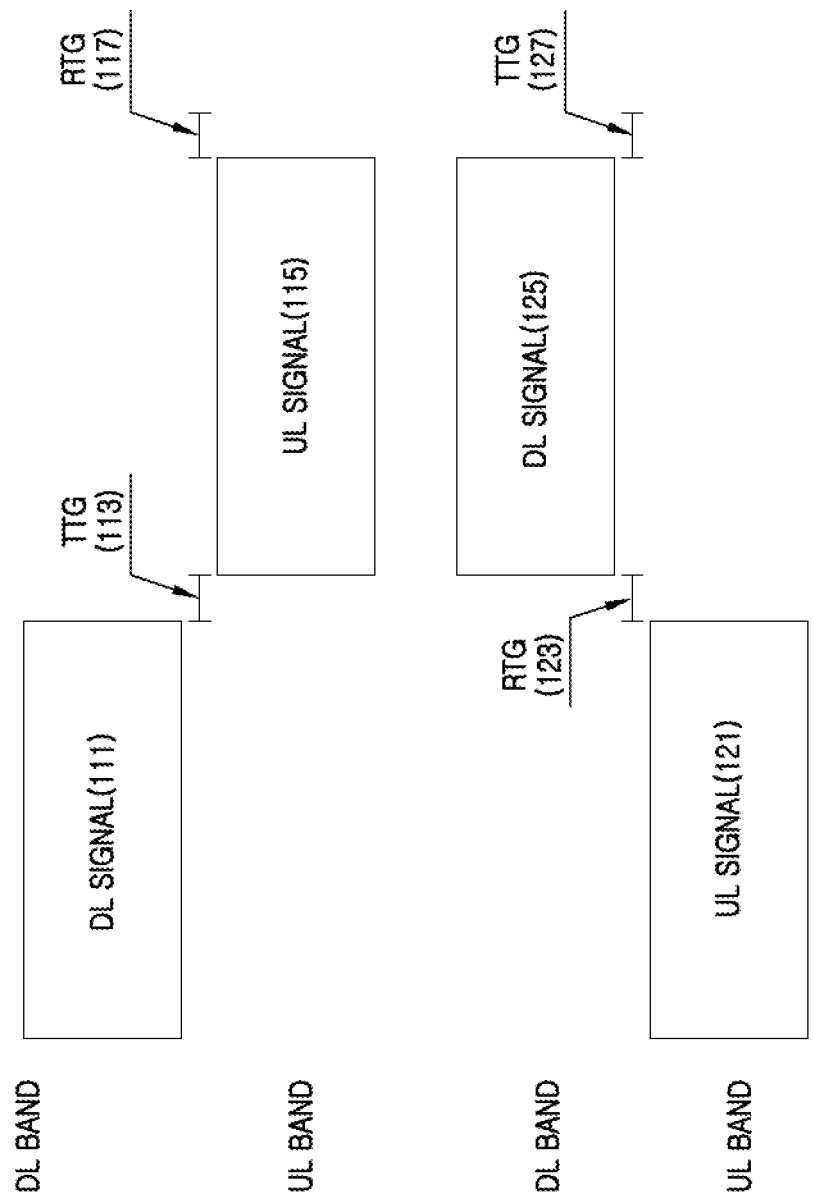
FIG. 1 is a diagram illustrating a frame use by Mobile Station (MS) group in a conventional wireless communication system using Half Frequency Division Duplex (H-FDD)
Figure 2:
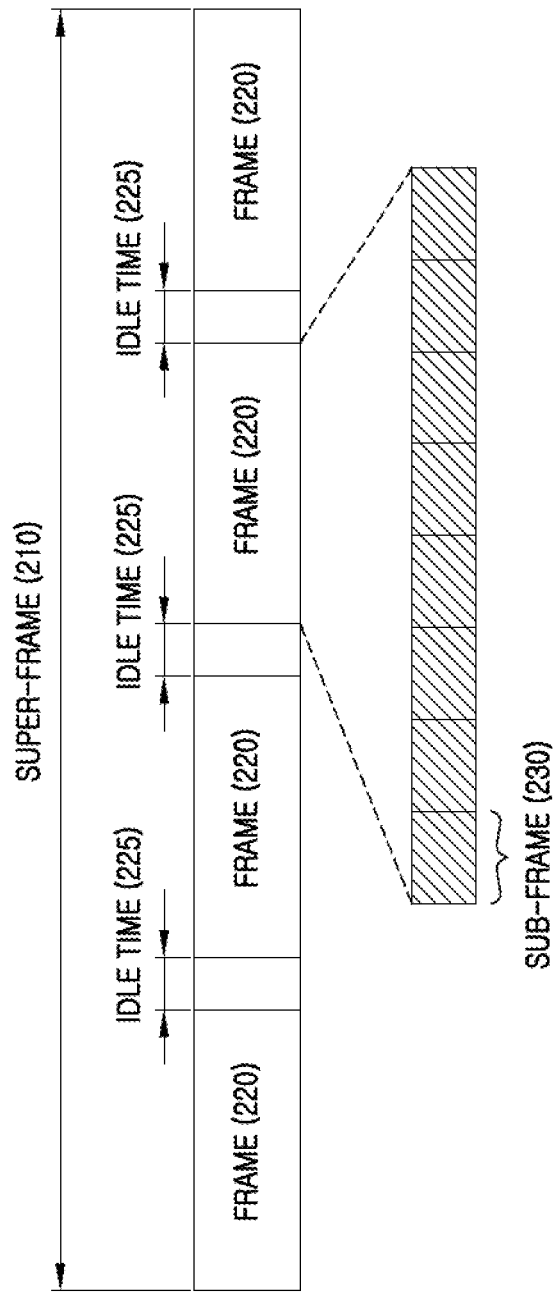
FIG. 2 is a diagram illustrating a frame structure of a broadband wireless communication system according to an exemplary embodiment of the present invention.

FIG. 2 is a diagram illustrating a frame structure of a broadband wireless communication system according to an exemplary embodiment of the present invention.

Referring to FIG. 2, a Base Station (BS) and Mobile Stations (MSs) perform communication according to a frame structure wherein one super-frame 210 is comprised of a plurality of frames 220. Each frame 220 is comprised of a plurality of sub-frames 230. Each sub-frame 230 is comprised of a plurality of OFDM symbols. An idle time 225 exists between the respective frames 220. The frame structure of FIG. 2 is applied to each of a DownLink (DL) band and an UpLink (UL) band for an H-FDD scheme.

Control information is transmitted once per super-frame 210. The control information includes items necessary to perform communication such as a Cyclic Prefix (CP) length, a bandwidth, resource block information, antenna related information, etc. Accordingly, the control information should have a robust characteristic. Therefore, the control information is organized into a physical signal in accordance with a previously designed scheme considering a cell characteristic, and occupies a predetermined amount of resource every time. Here, a design scheme for the physical signal of the control information may vary depending on a characteristic of the system and an intention of a designer using the present invention. For description convenience, the present invention assumes that the control information occupies one sub-frame 230. Also, for description convenience, in the present invention, a 'control information sub-frame' denotes a sub-frame including control information comprised of a physical signal.

On the basis of one MS following an H-FDD scheme, a DL interval and UL interval exist within one frame. The DL interval and UL interval are divided in a sub-frame unit. For example, in cases where one frame is comprised of eight sub-frames, and four sub-frames are allocated for each of DL communication and UL communication, first-group H-FDD MSs perform DL communication through the first four sub-frames, and perform UL communication through the last four sub-frames. To the contrary, second-group H-FDD MSs perform UL communication through the first four sub-frames, and perform DL communication through the last four sub-frames.

At the time of a change between a transmission mode and a reception mode due to frame conversion, each MS uses an idle time between frames as a Transmit/receive Transition Gap (TTG) interval or a Receive/transmit Transition Gap (RTG) interval. However, because there is not a separate idle time within one frame, there is no interval to be used as the TTG interval or RTG interval at the time of the change between the transmission mode and the reception mode within the frame. Accordingly, to accommodate the TTG interval or RTG interval, each MS uses a partial resource of a sub-frame of the time of the change between the transmission mode and the reception mode. Accordingly, when allocating a resource to an H-FDD MS, a BS does not allocate a resource within a TTG interval and RTG interval within a frame.

In an exemplary implementation, the BS and H-FDD MSs following the frame structure of FIG. 2 transmit/receive control information as follows.

The BS transmits a control information sub-frame through a first sub-frame of a start frame of each super-frame. Accordingly, first-group H-FDD MSs performing DL communication at a first sub-frame within every frame can receive the control information sub-frame without an additional operation. However, second-group H-FDD MSs are performing UL communication at the first sub-frame within every frame and thus cannot receive the control information sub-frame. Accordingly, the second-group H-FDD MSs have to operate in a reception mode at the time the control information sub-frame is transmitted, a time when they would otherwise be operating in a transmission mode. That is, because a time of transmission of the control information sub-frame is predefined, the second-group H-FDD MSs determine whether to operate in the reception mode or whether to operate in a transmission mode at the first sub-frame of the frame in dependence on transmission or non-transmission of the control information sub-frame. Accordingly, in the case of a frame at which the control information sub-frame is transmitted, the second-group H-FDD MSs maintain the reception mode at a first sub-frame of the frame, and receive the control information sub-frame.

After receiving the control information sub-frame, the second-group H-FDD MSs must be provided a TTG interval in order to change into a transmission mode. At this time, because there is no separate idle time between a first sub-frame and a second sub-frame, the second-group H-FDD MSs must use part of a rear end of the first sub-frame or part of a front end of the second sub-frame as the TTG interval.

Reducing a length of a time axis of a sub-frame for UL communication is not desirable for at least the following reasons. A feedback channel is used to provide state information on an MS necessary for an operation of a BS. The feedback channel is included in a UL sub-frame. In general, the feedback channel is used to transmit codewords that are comprised of a sequence of a predetermined length. At this time, the codewords are designed according to a resource amount and structure of the feedback channel. Accordingly, if a length of a time axis of the UL sub-frame decreases, a form of the feedback channel changes and thus, it is impossible to use a codeword designed suitably to the time axis length. Thus, it is desirable to use part of a DL sub-frame as the TTG interval, rather than part of the UL sub-frame.

Therefore, exemplary embodiments of the present invention use the rear end of the first sub-frame as the TTG interval. However, because the rear end of the first sub-frame is used as the TTG interval, the second-group H-FDD MSs fail to receive a rear end of the control information sub-frame. In other words, the second-group H-FDD MSs fail to receive part of the control information sub-frame and thus, cannot recover the control information.

To address this issue, the BS transmits the part of the control information sub-frame, which fails to be received by the second-group H-FDD MSs due to the TTG interval, through a rear end of the last sub-frame of an earlier frame at which the control information sub-frame is transmitted. In this case, the second-group H-FDD MSs perform DL communication through sub-frames of a rear end within a frame and therefore, can receive the part of the control information sub-frame transmitted through the rear end of the last sub-frame of the earlier frame at which the control information sub-frame is transmitted. Although the order of receiving a signal constituting the control information sub-frame is reversed, the second-group H-FDD MSs receive all of the control information sub-frame.

Figure 3A:
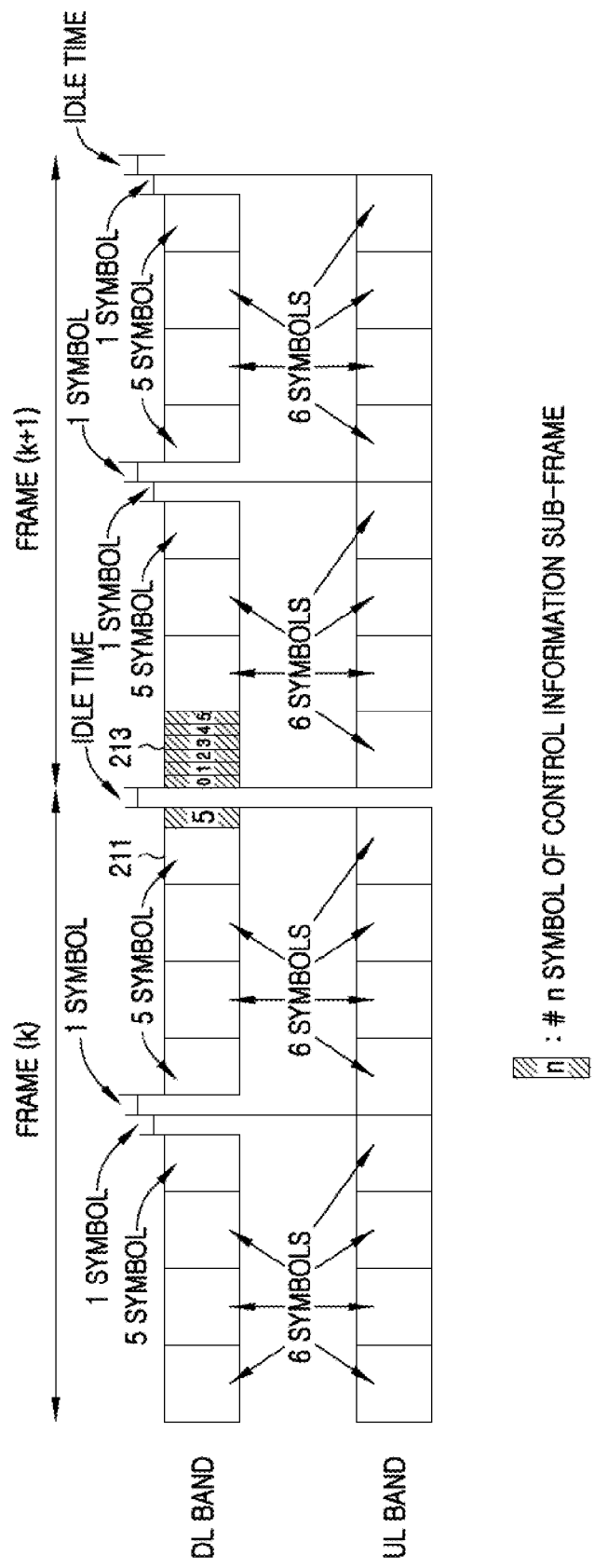
FIGS. 3A to 3C are diagrams illustrating examples of a frame used for control information transmission/reception of a broadband wireless communication system according to an exemplary embodiment of the present invention.
Figure 3B:
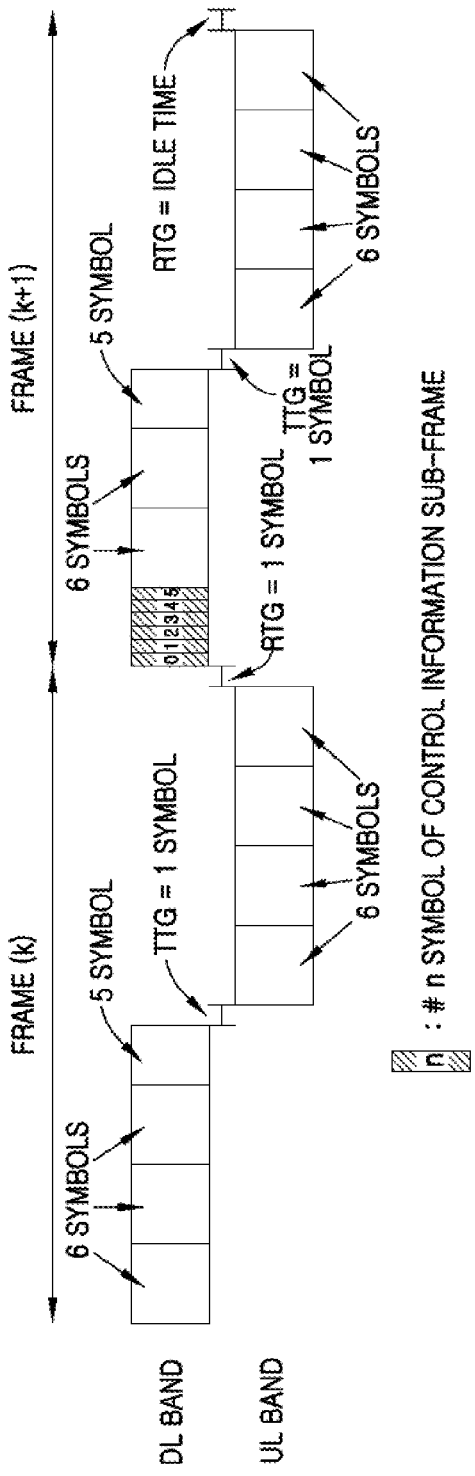
Figure 3C:
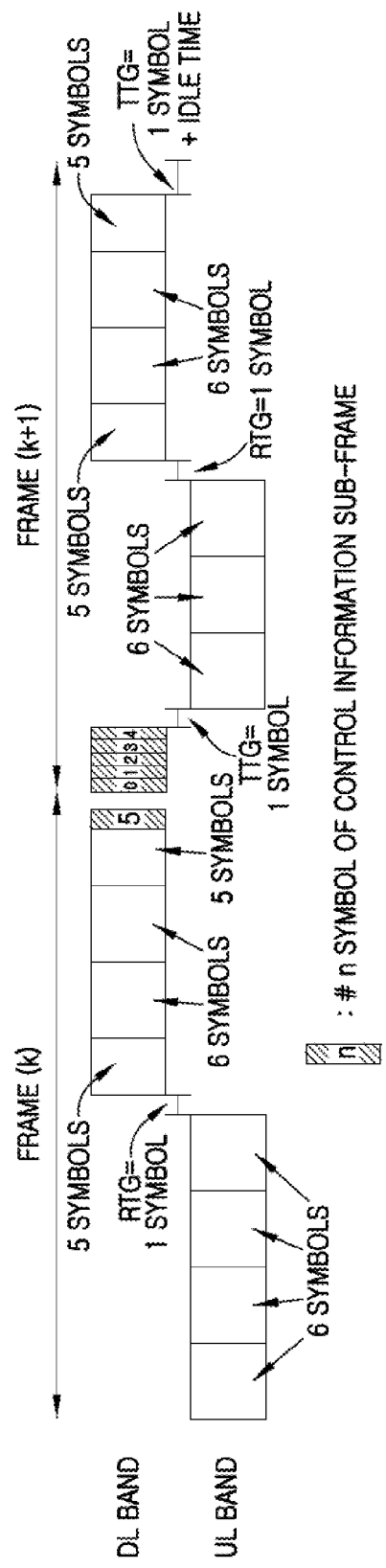

FIGS. 3A to 3C illustrate examples of a frame used for control information transmission/reception of a broadband wireless communication system according to an exemplary embodiment of the present invention. In FIGS. 3A to 3C, one frame is illustrated as comprised of eight sub-frames, one sub-frame is comprised of six OFDM symbols, the H-FDD MS uses four sub-frames for DL communication and remaining sub-frames for UL communication, and a TTG interval and RTG interval have a length of one OFDM symbol. Of course, this is for ease of description and is not intended to limit the scope of the invention.

FIG. 3A illustrates examples of structures of a frame before a control information sub-frame of a BS is transmitted and a frame at which the control information sub-frame is transmitted.

Referring to FIG. 3A, a DL band of a frame (k) is described. The BS transmits DL signals to first-group H-FDD MSs through first to third sub-frames and five symbols of a front end within a fourth frame. Because the last symbol of the fourth sub-frame is equal to a TTG interval of the first-group H-FDD MSs, the BS does not use the last OFDM symbol of the fourth sub-frame. Similarly, because a first symbol of a fifth sub-frame is equal to an RTG interval of second-group H-FDD MSs, the BS does not use a first symbol of a fifth sub-frame. The BS transmits DL signals to the second-group H-FDD MSs through five symbols of a rear end within the fifth sub-frame, a sixth sub-frame, a seventh sub-frame, and five symbols of a front end within an eighth sub-frame 211. After that, the BS transmits control information through the sixth symbol of the eighth sub-frame 211 (i.e., transmits a #5 symbol of a control information sub-frame).

A DL band of a frame (k+1) is described. The BS transmits control information through all six symbols of a first sub-frame 213 (i.e., transmits symbols #0 to #5 of a control information sub-frame), and transmits DL signals to the first-group H-FDD MSs through a second sub-frame, a third sub-frame, and five symbols of a front end within a fourth sub-frame. Because the last symbol of the fourth sub-frame is equal to a TTG interval of the first-group H-FDD MSs, the BS does not use the last OFDM symbol of the fourth sub-frame. Similarly, because the first symbol of the fifth sub-frame is equal to an RTG interval of the second-group H-FDD MSs, the BS does not use the first symbol of the fifth sub-frame. The BS transmits DL signals to the second-group H-FDD MSs through five symbols of a rear end within the fifth sub-frame, a sixth sub-frame, a seventh sub-frame, and five symbols of a front end within an eighth sub-frame.

Uplink bands of a frame (k) and a frame (k+1) are described. The BS receives a UL signal from the second-group H-FDD MS through first to fourth sub-frames, and receives a UL signal from the first-group H-FDD MS through fifth to eighth sub-frames.

FIG. 3B illustrates an example of the use of a frame before a control information sub-frame of a first-group H-FDD MS is transmitted and a frame at which the control information sub-frame is transmitted.

Referring to FIG. 3B, a DL band and a UL band of a frame (k) are described. First-group H-FDD MSs receive DL signals through first to third sub-frames of the DL band and five symbols of a front end within a fourth sub-frame, and use the last symbol interval of the fourth sub-frame as a TTG interval. The first-group H-FDD MSs, having changed into a transmission mode during the TTG interval, transmit UL signals through fifth to eighth sub-frames of the UL band.

A DL band and a UL band of a frame (k+1) are described. The first-group H-FDD MSs receive a control information sub-frame through a first sub-frame of the DL band, receive DL signals through second and third sub-frames and five symbols of a front end within a fourth sub-frame, and use the last symbol interval of the fourth sub-frame as a TTG interval. The first-group H-FDD MSs, having changed into a transmission mode during the TTG interval, transmit UL signals through fifth to eighth sub-frames of the UL band.

FIG. 3C illustrates an example of the use of a frame before a control information sub-frame of second-group H-FDD MSs is transmitted and a frame at which the control information sub-frame is transmitted.

Referring to FIG. 3C, a DL band and a UL band of a frame (k) are described. The second-group H-FDD MSs transmit UL signals through first to fourth sub-frames of the UL band. The second-group H-FDD MSs change into a reception mode by using a first symbol interval of a fifth sub-frame of the DL band as an RTG interval. The second-group H-FDD MSs receive DL signals through five symbols of a rear end of the fifth sub-frame, a sixth sub-frame, a seventh sub-frame, and five symbols of a front end of an eighth sub-frame. Also, the second-group H-FDD MSs receive control information in the last symbol of the eighth sub-frame (i.e., a #5 symbol of the control information sub-frame).

A DL band and a UL band of a frame (k+1) are described. The second-group H-FDD MSs receive control information through the first five symbols of a front end within a first sub-frame of the DL band (i.e., symbols #0 to #4 symbols of a control information sub-frame), and use the last symbol of the first sub-frame as an TTG interval. The second-group H-FDD MSs, having changed into a transmission mode during the TTG interval, transmit UL signals through second to fourth sub-frames of the UL band. Subsequently, the second-group H-FDD MSs change into a reception mode by using a first symbol interval of a fifth sub-frame of the DL band as an RTG interval, and receive DL signals through five symbols of a rear end of the fifth sub-frame, a sixth sub-frame, a seventh sub-frame, and five symbols of a front end within an eighth sub-frame.

Exemplary operations and constructions of a BS and H-FDD MS for transmitting/receiving control information as above are described below with reference to the drawings.

Figure 4:
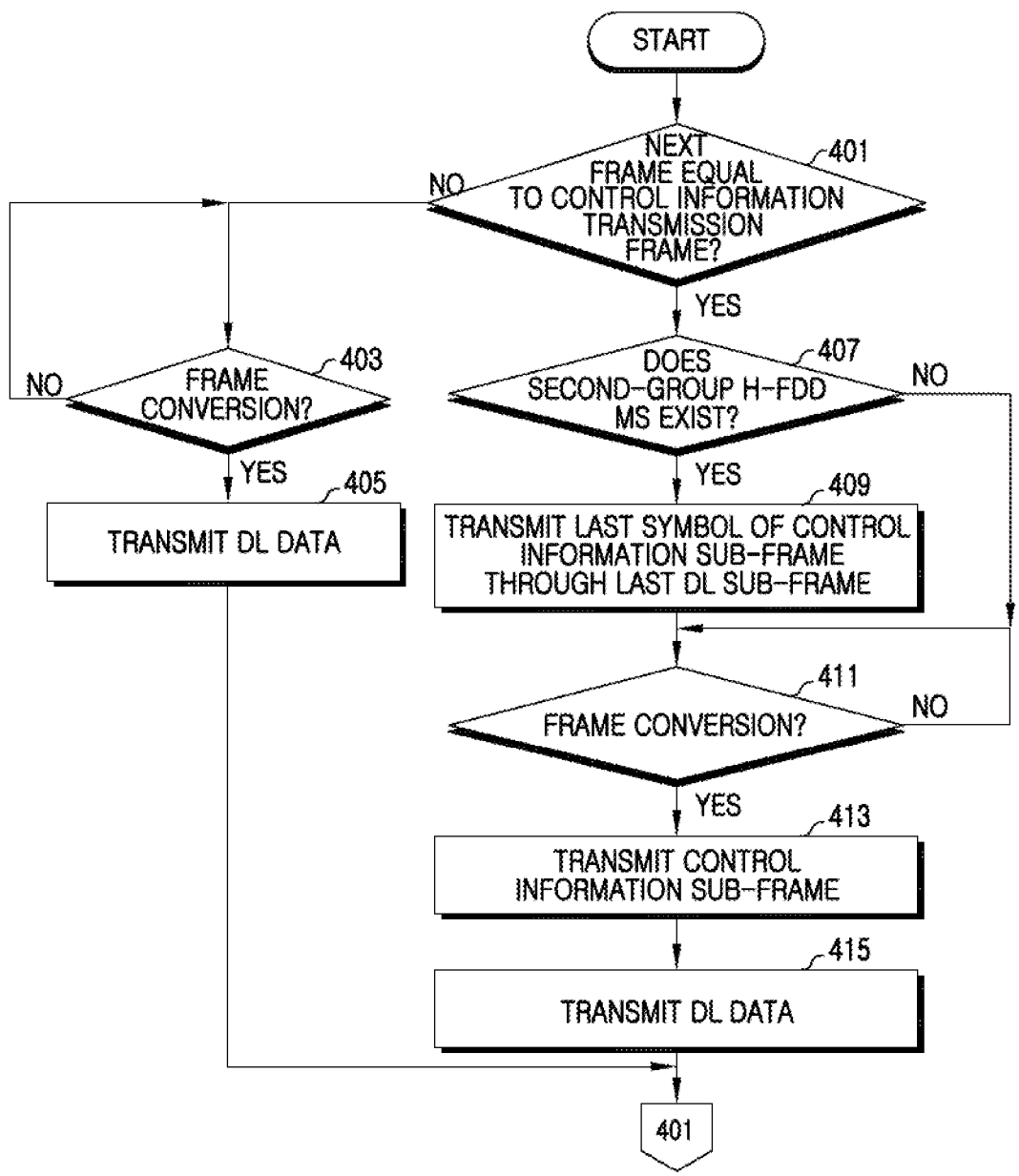
FIG. 4 is a flow diagram illustrating an operation procedure of a Base Station (BS) in a broadband wireless communication system according to an exemplary embodiment of the present invention.

FIG. 4 is a flow diagram illustrating an operation procedure of a BS in a broadband wireless communication system according to an exemplary embodiment of the present invention. More particularly, FIG. 4 illustrates an operation procedure using a DL band of the BS.

Referring to FIG. 4, in step 401, the BS determines if a next frame is equal to a control information transmission frame. In other words, for the sake of second-group H-FDD MSs, the BS determines if it has to transmit part of the control information sub-frame at a current frame.

If it is determined in step 401 that the next frame is not equal to the control information transmission frame, the BS proceeds to step 403 and determines if there is a frame conversion. That is, the BS transmits DL data required to be transmitted at the current frame and then identifies if an end time of the current frame arrives.

If it is determined in step 403 that there is a frame conversion, the BS proceeds to step 405 and, after the lapse of an idle time, transmits DL data required to be transmitted at a corresponding frame. Here, the DL data may include traffic data, a control message, etc. That is, the BS converts the DL data into complex symbols through modulation, constructs OFDM symbols through Inverse Fast Fourier Transform (IFFT) operation and Cyclic Prefix (CP) insertion, up-converts the OFDM symbols into a signal of a DL band, and transmits the signal through an antenna.

On the other hand, if it is determined in step 401 that the next frame is equal to the control information transmission frame, the BS proceeds to step 407 and determines if there is a second-group H-FDD MS. That is, the BS determines if there is an H-FDD MS operating in a reception mode at a first sub-frame of a frame. If it is determined in step 407 that there is not a second-group H-FDD MS, the BS proceeds to step 411.

On the other hand, if it is determined in step 407 that there is a second-group H-FDD MS, the BS proceeds to step 409 and transmits the last symbol of a control information sub-frame through the last sub-frame of the current frame. The last symbol of the control information sub-frame is transmitted through a predefined position of the last sub-frame. For example, the BS transmits the last symbol of the control information sub-frame as the last symbol of the last sub-frame. Here, transmitting the last symbol is performed based on the assumption that, due to a TTG interval, the second-group H-FDD MSs fail to receive only the last symbol of the control information sub-frame. Accordingly, if the second-group H-FDD MSs fail to receive a plurality of symbols due to an increase of a length of the TTG interval, the BS transmits all of the plurality of symbols.

After that, the BS proceeds to step 411 and determines if there is a frame conversion. That is, the BS determines if an end time of the current frame arrives.

If it is determined in step 411 that there is a frame conversion, the BS proceeds to step 413 and, after the lapse of an idle time, transmits the control information sub-frame. In other words, the BS transmits all symbols of the control information sub-frame through a first sub-frame of a DL band.

Then, the BS proceeds to step 415 and transmits DL data required to be transmitted at a corresponding frame. Here, the DL data may include traffic data, a control message, etc. That is, the BS converts the DL data into complex symbols through modulation, constructs OFDM symbols through IFFT operation and CP insertion, up-converts the OFDM symbols into a signal of a DL band, and transmits the signal through the antenna. After that, the BS returns to step 401.

Figure 5:
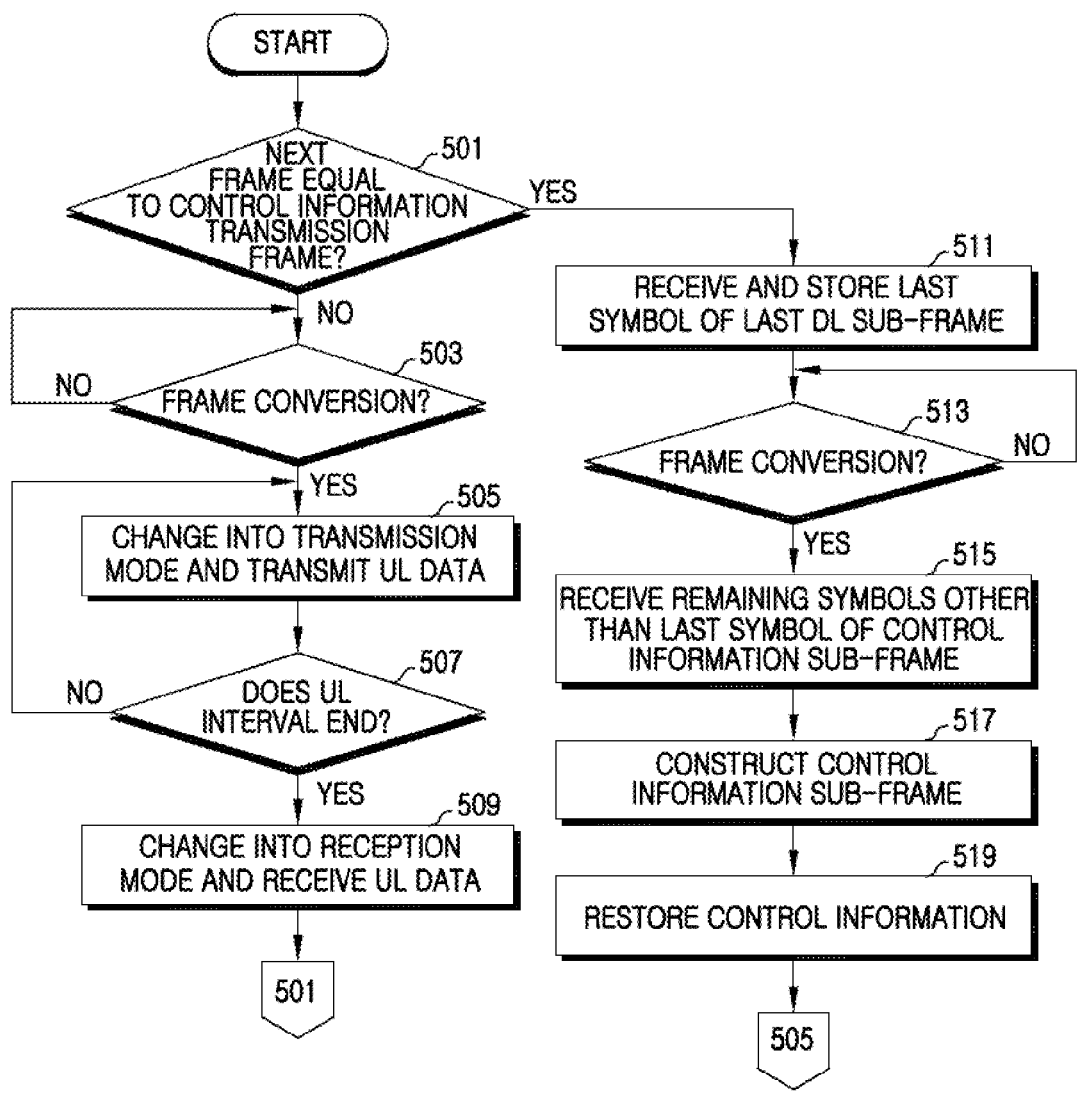
FIG. 5 is a flow diagram illustrating an operation procedure of an MS in a broadband wireless communication system according to an exemplary embodiment of the present invention.

FIG. 5 is a flow diagram illustrating an operation procedure of an MS in a broadband wireless communication system according to an exemplary embodiment of the present invention. More particularly, FIG. 5 illustrates an operation procedure of a second-group H-FDD MS.

Referring to FIG. 5, in step 501, the MS determines if a next frame is equal to a control information transmission frame. In other words, the MS determines if it has to receive part of the control information sub-frame at a current frame.

If it is determined in step 501 that the next frame is not equal to the control information transmission frame, the MS proceeds to step 503 and determines if there is a frame conversion. That is, the MS determines if an end time of the current frame arrives.

If it is determined in step 503 that there is a frame conversion, the MS proceeds to step 505 and, during an idle time, changes into a transmission mode and transmits UL data. That is, the MS converts the UL data into complex symbols through modulation, constructs OFDM symbols through IFFT operation and CP insertion, up-converts the OFDM symbols into a signal of an UL band, and transmits the OFDM symbols through an antenna. However, if there is no UL data to be transmitted, the UL data transmission operation of step 505 can be omitted.

The MS proceeds to step 507 and determines if a UL interval ends. That is, the MS determines if an end time of a transmission interval according to an H-FDD scheme arrives.

If it is determined in step 507 that the UL interval ends, the MS proceeds to step 509 and, during an RTG interval, changes into a reception mode and then receives DL data. That is, the MS down-converts a signal received through a DL band into a baseband signal, divides the baseband signal in an OFDM symbol unit, and restores complex symbols through CP elimination and Fast Fourier Transform (FFT) operation, and restores the DL data through demodulation. Then, the MS returns to step 501.

If it is determined in step 501 that the next frame is equal to the control information transmission frame, in step 511 the MS receives the last symbol of the last DL sub-frame of the current frame and stores the last symbol as the last symbol of the control information sub-frame. Here, the storing of the last symbol is based on the assumption that, due to a TTG interval, the MS fails to receive only the last symbol of the control information sub-frame. Thus, if the MS fails to receive a plurality of symbols due to an increase of a length of the TTG interval, the MS receives and stores a plurality of symbols of the last DL sub-frame.

The MS proceeds to step 513 and determines if there is a frame conversion. That is, the MS determines if an end time of the current frame arrives.

If it is determined in step 513 that there is a frame conversion, the MS proceeds to step 515 and, during an idle time, maintains a reception mode with no change into a transmission mode and, through a first sub-frame, receives remaining symbols other than the last symbol of the control information sub-frame. Here, the receiving of the remaining symbols other than the last symbol is based on the assumption that, due to a TTG interval, the MS fails to receive only the last symbol of the control information sub-frame. Accordingly, if the MS fails to receive a plurality of symbols due to an increase of a length of the TTG interval, the MS receives remaining symbols other than the plurality of symbols.

The MS proceeds to step 517 and constructs a control information sub-frame by combining the last symbol of the control information sub-frame stored in step 511 and the remaining symbols received in step 515. In other words, the MS constructs a control information sub-frame of a decodable form by combining the last symbol to the back of the remaining symbols.

After constructing the control information sub-frame, the MS proceeds to step 519 and restores control information by decoding the control information sub-frame. In other words, the MS classifies physical signals constituting the control information sub-frame in a processing unit according to a previously designed scheme, and demodulates and decodes the physical signals, thereby restoring the control information. By doing so, the MS acquires control information essential to communication. Then, the MS returns to step 505 and, during a TTG interval, changes into a transmission mode and then performs subsequent steps.

Figure 6:
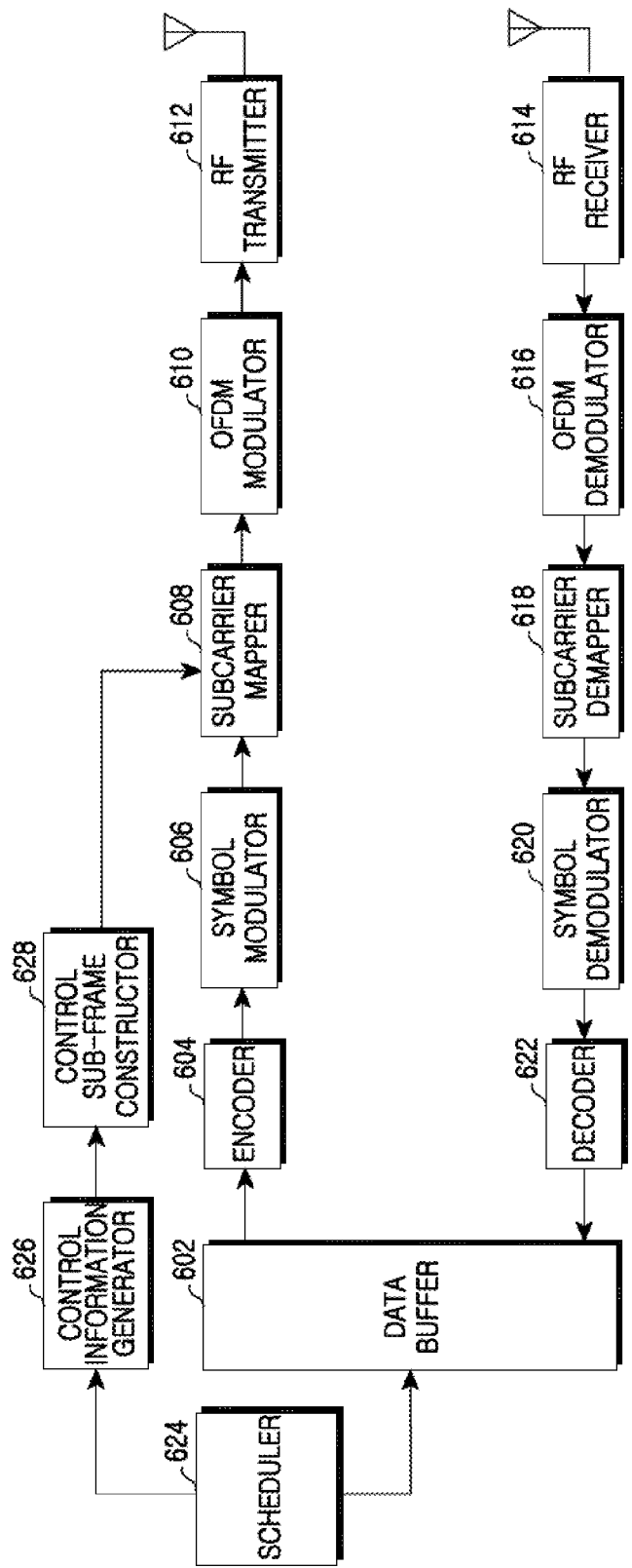
FIG. 6 is a block diagram illustrating a construction of a BS in a broadband wireless communication system according to an exemplary embodiment of the present invention.

FIG. 6 is a block diagram illustrating a construction of a BS in a broadband wireless communication system according to an exemplary embodiment of the present invention.

Referring to FIG. 6, the BS includes a data buffer 602, an encoder 604, a symbol modulator 606, a subcarrier mapper 608, an OFDM modulator 610, a Radio Frequency (RF) transmitter 612, an RF receiver 614, an OFDM demodulator 616, a subcarrier demapper 618, a symbol demodulator 620, a decoder 622, a scheduler 624, a control information generator 626, and a control sub-frame constructor 628.

The data buffer 602 stores data exchanged with MSs, and outputs the stored data depending on the scheduling result of the scheduler 624. The encoder 604 channel-codes an information bit stream provided from the data buffer 602. The symbol modulator 606 converts the channel-coded bit stream into complex symbols through demodulation. The subcarrier mapper 608 maps the complex symbols into a frequency domain depending on a resource allocation result of the scheduler 624. More particularly, according to an exemplary embodiment of the present invention, the subcarrier mapper 608 maps a control information sub-frame, which is provided from the control sub-frame constructor 628, to a first frame of a control information transmission frame. The subcarrier mapper 608 maps the last symbol of the control information sub-frame to a predefined position within the last sub-frame of a frame that is earlier than the control information transmission frame. For example, the last symbol of the control information sub-frame is mapped to the last symbol of the last sub-frame of the frame that is earlier than the control information transmission frame.

The OFDM modulator 610 converts complex symbols mapped to a frequency domain into a time domain signal through IFFT operation, and constructs an OFDM symbol by inserting a CP. The RF transmitter 612 up-converts a baseband signal into a DL band signal, and transmits the DL band signal through an antenna. The RF receiver 614 down-converts a UL band signal received through the antenna into a baseband signal. After dividing a signal provided from the RF receiver 614 in an OFDM symbol unit, the OFDM demodulator 616 eliminates a CP, and restores complex symbols mapped to a frequency domain through FFT operation. The subcarrier demapper 618 classifies complex symbols mapped to a frequency domain in a processing unit. The symbol demodulator 620 converts complex symbols into a bit stream through demodulation. By channel-decoding the bit stream, the decoder 622 restores an information bit stream.

The scheduler 624 performs scheduling for resource use. That is, the scheduler 624 allocates a resource for UL communication and DL communication of an MS, and decides a time of transmission of control information. More particularly, if a next frame is equal to a control information transmission frame, the scheduler 624 determines if there is a second-group H-FDD MS. If it is determined that there is the second-group H-FDD MS, the scheduler 624 allocates a resource for transmitting the last symbol of the control information sub-frame within the last sub-frame of a current frame. The resource for transmitting the last symbol of the control information sub-frame has a predefined position of the last sub-frame. For example, the scheduler 624 allocates the last symbol interval of the last sub-frame as a resource for transmitting the last symbol of the control information sub-frame.

The control information generator 626 generates control information according to an instruction of the scheduler 624. That is, the control information generator 626 collects information essential to communication such as a CP length, a bandwidth, resource block information, antenna related information, etc., and generates a control information bit stream including the collected information according to a designed scheme.

The control sub-frame constructor 628 constructs a control information sub-frame. In more detail, the control sub-frame constructor 628 converts control information generated by the control information generator 626 into signals through encoding and modulation, and constructs the control information sub-frame by arranging the signals according to a design structure of the control information sub-frame. And, the control sub-frame constructor 628 provides the control information sub-frame to the subcarrier mapper 608.

Figure 7:
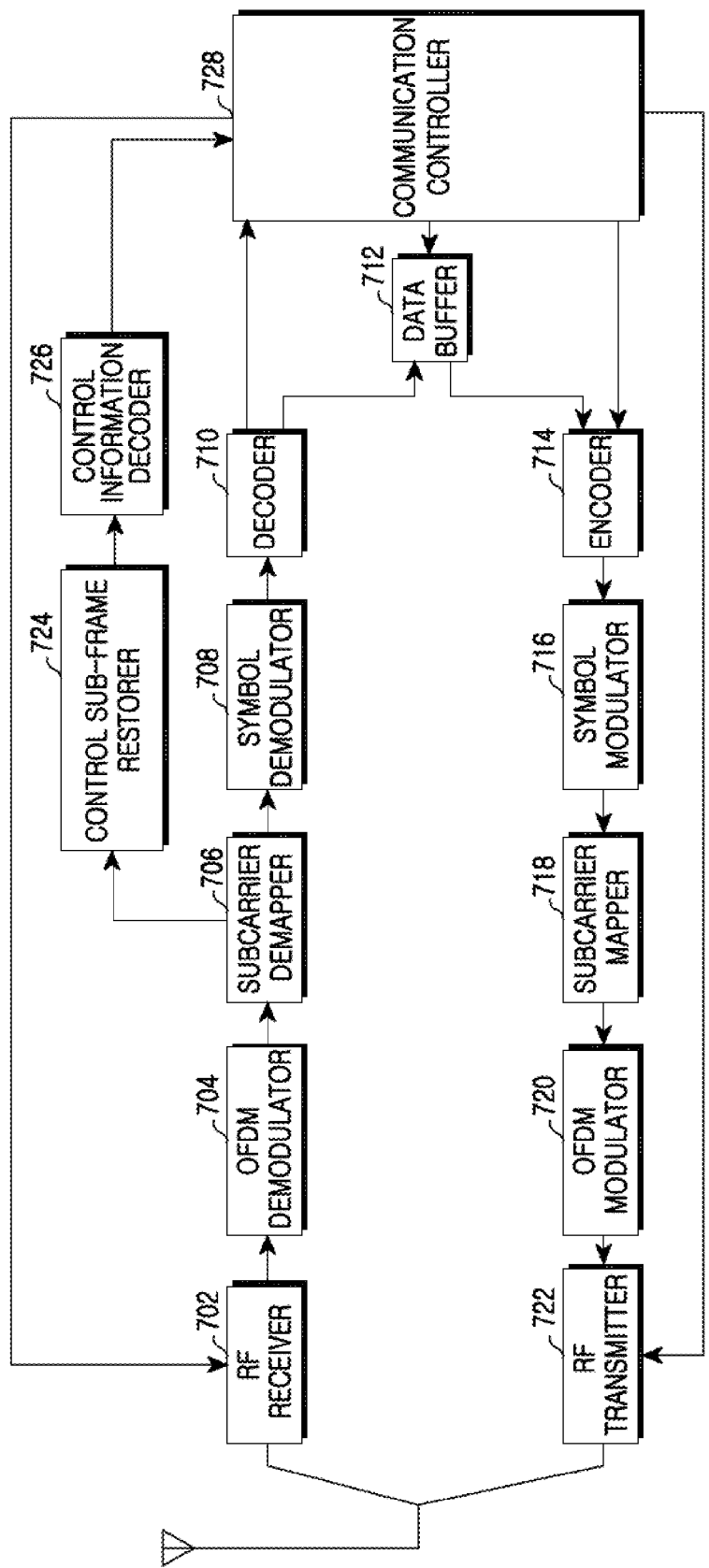
FIG. 7 is a block diagram illustrating a construction of an MS in a broadband wireless communication system according to an exemplary embodiment of the present invention.

FIG. 7 is a block diagram illustrating a construction of an MS in a broadband wireless communication system according to an exemplary embodiment of the present invention.

Referring to FIG. 7, the MS includes an RF receiver 702, an OFDM demodulator 704, a subcarrier demapper 706, a symbol demodulator 708, a decoder 710, a data buffer 712, an encoder 714, a symbol modulator 716, a subcarrier mapper 718, an OFDM modulator 720, an RF transmitter 722, a control sub-frame restorer 724, a control information decoder 726, and a communication controller 728.

The RF receiver 702 down-converts a DL band signal received through an antenna into a baseband signal. After dividing a signal provided from the RF receiver 702 in an OFDM symbol unit, the OFDM demodulator 704 eliminates a CP, and restores complex symbols mapped to a frequency domain through FFT operation. The subcarrier demapper 706 classifies complex symbols mapped to a frequency domain in a processing unit. That is, the subcarrier demapper 706 extracts symbols of a control information sub-frame and provides the extracted symbols to the control sub-frame restorer 724, and extracts a DL data signal and provides the extracted data signal to the symbol demodulator 708. More particularly, if the MS is equal to a second-group H-FDD MS, the subcarrier demapper 706 extracts the last symbol of the control information sub-frame from the last sub-frame of a frame that is earlier than a control information transmission frame, and extracts remaining symbols from a first sub-frame of the control information transmission frame.

The symbol demodulator 708 converts complex symbols into a bit stream through demodulation. By channel-decoding the bit stream, the decoder 710 restores an information bit stream. The data buffer 712 stores data exchanged with a BS, and outputs the stored data according to a control of the communication controller 728. The encoder 714 channel-codes an information bit stream provided from the data buffer 712. The symbol modulator 716 converts the channel-coded bit stream into complex symbols through demodulation. The subcarrier mapper 718 maps the complex symbols into a frequency domain. The OFDM modulator 720 converts complex symbols mapped to a frequency domain into a time domain signal through IFFT operation, and constructs an OFDM symbol by inserting a CP. The RF transmitter 722 up-converts the baseband signal into a UL band signal, and transmits the UL band signal through the antenna.

The control sub-frame restorer 724 constructs a control information sub-frame using symbols of the control information sub-frame provided from the subcarrier demapper 706. If the MS is equal to a first-group H-FDD MS, the symbols of the control information sub-frame are all received through a first sub-frame of a control information transmission frame. In this case, the control sub-frame restorer 724 constructs a control information sub-frame by sequentially buffering symbols of the control information sub-frame provided from the subcarrier demapper 706. On the other hand, if the MS is equal to a second-group H-FDD MS, the last symbol of the control information sub-frame is received earlier than remaining symbols. In this case, the control sub-frame restorer 724 stores the last symbol of the control information sub-frame provided from the subcarrier demapper 706, and constructs the control information sub-frame by combining the remaining symbols provided after frame conversion and the last symbol. In other words, the control sub-frame restorer 724 constructs a control information sub-frame of a decodable form by combining the last symbol to the back of the remaining symbols.

The control information decoder 726 restores control information by decoding a control information sub-frame constructed by the control sub-frame restorer 724. In other words, the control information decoder 726 classifies physical signals constituting the control information sub-frame in a processing unit according to a previously designed scheme, and restores the control information by demodulating and decoding the physical signals. And, the control information decoder 726 provides restored control information to the communication controller 728.

The communication controller 728 controls a general function for UL communication and DL communication of the MS. That is, the communication controller 728 controls the RF receiver 702 and the RF transmitter 722 to switch a transmission mode and a reception mode according to an H-FDD scheme. Also, the communication controller 728 analyzes a control message provided from the decoder 710, and generates a control message to be transmitted to a BS. More particularly, if the MS is equal to a second-group H-FDD MS, the communication controller 728 controls to exceptionally operate in a reception mode at a first frame of a control information transmission frame.

By repeatedly transmitting part of control information and extending a reception mode interval of an MS in a broadband wireless communication system using H-FDD, the present invention can transmit the control information to all MSs by less overhead.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting control information by a Base Station (BS) in a wireless communication system using Half Frequency Division Duplex (H-FDD), the method comprising:

generating a control information sub-frame;

mapping symbols of the control information sub-frame at a first sub-frame of a first frame;

repeatedly mapping at least one symbol among the symbols of the control information at a last sub-frame of a second frame that is earlier than the first frame;

transmitting the at least one symbol through the last sub-frame of the second frame and the symbols of the control information sub-frame through the first sub-frame of the first frame, and determining if there is an H-FDD Mobile Station (MS) operating in a transmission mode at a front end of the first frame, wherein the transmitting of the at least one symbol at the last sub-frame of the frame earlier than the first frame is performed when there is the H-FDD MS operating in the transmission mode at the front end of the first frame.

2. The method of claim 1, wherein the transmitting of the at least one symbol comprises transmitting the at least one symbol as a last symbol of the last downlink sub-frame of the frame earlier than the first frame.

3. The method of claim 1, wherein the control information comprises at least one of a Cyclic Prefix (CP) length, a bandwidth, resource block information, and antenna related information.

4. An apparatus for a Base Station (BS) in a wireless communication system using Half Frequency Division Duplex (H-FDD), the apparatus comprising:

a control sub-frame constructor for generating a control information sub-frame;

a mapper for mapping symbols of the control information sub-frame at a first sub-frame of a first frame, and for repeatedly mapping at least one symbol among the symbols of the control information at a last sub-frame of a second frame that is earlier than the first frame;

a transmitter for transmitting the at least one symbol through the last sub-frame of the second frame and the symbols of the control information sub-frame through the sub-frame of the first frame; and a scheduler for, if there is an H-FDD Mobile Station (MS) operating in a transmission mode at a front end of the first frame, determining to map the at least one symbol to a last sub-frame of the frame earlier than the first frame.

5. The apparatus of claim 4, wherein the at least one symbol is transmitted as a last symbol of the last downlink sub-frame of the frame earlier than the first frame.

6. The apparatus of claim 4, wherein the control information comprises at least one of a Cyclic Prefix (CP) length, a bandwidth, resource block information, and antenna related information.

7. A wireless communication system using Half Frequency Division Duplex (H-FDD), the system comprising:

a Mobile Station (MS) for receiving at least one symbol of a control information sub-frame through a last downlink sub-frame of a second frame that is earlier than a first frame in which control information is transmitted, for receiving at least one remaining symbol of the control information sub-frame, other than the at least one symbol, by maintaining a reception mode at a first sub-frame of the first frame, and for constructing the control information sub-frame by combining the at least one symbol and the at least one remaining symbol, wherein the MS changes into a transmission mode by using, as a Transmit/receive Transition Gap (TTG) interval, an interval other than a reception interval of the at least one remaining symbol of a first sub-frame interval of the first frame.

8. The system of claim 7, further comprising a Base Station (BS) for transmitting the at least one symbol at the last sub-frame of the second frame, and for transmitting symbols constituting the control information sub-frame at the first sub-frame of the first frame.

9. The system of claim 8, wherein the at least one symbol is transmitted as a last symbol of the last downlink sub-frame of a frame earlier than the control information transmission frame.

10. The system of claim 7, wherein the control information comprises at least one of a Cyclic Prefix (CP) length, a bandwidth, resource block information, and antenna related information.

* * * * *